(12) United States Patent
Ganguli et al.

(10) Patent No.: US 6,251,460 B1
(45) Date of Patent: Jun. 26, 2001

(54) REFINING OF VEGETABLE OIL

(75) Inventors: Keshab Lal Ganguli; Karel Petrus Agnes Maria van Putte; Vangelis Stavridis, all of Vlaardingen (NL)

(73) Assignee: Unilever Patent Holdings BV, Vlaardingen (NL)

( * ) Notice: Subject to any disclaimer, the term of this patent is extended or adjusted under 35 U.S.C. 154(b) by 0 days.

(21) Appl. No.: 09/468,802

(22) Filed: Dec. 21, 1999

(30) Foreign Application Priority Data

Dec. 22, 1998 (EP) .................................................. 98204360

(51) Int. Cl.[7] ........................................................ A23D 9/04
(52) U.S. Cl. ........................ 426/330.6; 426/417; 426/601; 554/8; 554/9
(58) Field of Search .................................... 426/417, 601, 426/474, 425, 330.6, 475, 489, 486, 495; 554/8, 9

(56) References Cited

U.S. PATENT DOCUMENTS

| | | | | |
|---|---|---|---|---|
| 2,199,364 | * | 4/1940 | Musher | 426/542 |
| 2,221,404 | * | 11/1940 | Musher | 426/330.6 |
| 2,282,780 | * | 5/1942 | Musher | 426/417 |
| 4,370,274 | * | 1/1983 | Finch | 260/412.3 |
| 4,452,744 | * | 6/1984 | Finch | 260/412.2 |
| 5,073,398 | * | 12/1991 | Kuss | 426/613 |
| 5,089,139 | * | 2/1992 | Asbeck | 426/330.6 |
| 5,241,092 | * | 8/1993 | Cheng | 554/205 |
| 5,298,271 | * | 3/1994 | Takashina | 426/417 |
| 5,315,020 | * | 5/1994 | Cheng | 554/184 |
| 5,315,021 | * | 5/1994 | Beharry et al. | 554/190 |
| 5,374,751 | * | 12/1994 | Cheng | 554/205 |
| 5,401,866 | * | 3/1995 | Cheng | 554/184 |
| 5,626,756 | * | 5/1997 | Heidlas | 210/634 |
| 5,637,338 | * | 6/1997 | Van Aalst | 426/417 |
| 5,962,056 | * | 10/1999 | Melin | 426/417 |
| 5,972,400 | * | 10/1999 | Bonazelli | 426/474 |
| 5,998,641 | * | 12/1999 | Ganguli | 426/417 |
| 6,037,492 | * | 3/2000 | de Hierro | 562/498 |
| 6,113,971 | * | 9/2000 | Elmaleh | 426/603 |
| 6,117,469 | * | 12/2000 | Ganguli | 426/474 |
| 6,159,524 | * | 12/2000 | Livingston | 426/603 |
| 6,162,480 | * | 12/2000 | van Buuren | 426/330.6 |

FOREIGN PATENT DOCUMENTS

| | | | |
|---|---|---|---|
| 743977 | * | 10/1966 | (CA) . |
| 0398409 | * | 11/1990 | (EP) . |
| 1046341 | * | 10/2000 | (EP) . |
| 2 246 362 | * | 1/1992 | (GB) . |
| WO94/12596 | * | 6/1994 | (WO) . |

OTHER PUBLICATIONS

Werman 1986 JAOCS 63(3) 355.*
Brunetti 1989 JACOS 66(2) 209.*
Bondioli 1992 JAOCS 69(5) 477.*
Bondioli 1993 JAOCS 70(8) 763.*
Gonzalez 1999 JAOCS 76(12) 1471.*
Nergi 1991 J Sci Food Agric 56, 79–84.*
Di Giovacchino 1994 JAOCS 71(11) 1189.*
Ruiz–Mendez 1996 JAOCS 71(12) 1641.*
Hui 1996 Beuleyo Industrial Oil and Fat Products 5th edition, vol. 2 John Wiley & Sons New York pp. 241–266.*
Swern 1979 Beuleys Industrial Oil and Fal Products, vol. 1 John Wiley & Sons New York pp. 68–373.*
Gomes et al, J. Agric. Food Chem., 46:1137–1142 (1998).*
Hui, Bailey's Industrial Oil and Fat Products, 2:252–269.*

* cited by examiner

*Primary Examiner*—Carolyn Paden
(74) *Attorney, Agent, or Firm*—Pillsbury Winthrop LLP

(57) ABSTRACT

The present invention relates to a process for refining high acidity vegetable oil that includes a) stripping an optionally bleached vegetable oil with steam at a temperature of 120 to 250° C. and a pressure of 0.7 to 5 mbar for 1 to 60 minutes;
b) treating the oil obtained with lye;
c) bleaching the oil obtained;
d) stripping the bleached oil obtained with steam at a temperature of 120–250° C. and a pressure of 0.7–5 mbar for 5–120 minutes.

The resulting oil is bland, transparent and colorless. Refined olive oil is suited for blending with a virgin olive oil or to be used as an ingredient for the preparation of spreads, mayonnaises, tomato sauces and salad oils.

10 Claims, No Drawings

REFINING OF VEGETABLE OIL

The present invention is concerned with a novel process for refining crude vegetable oil, particularly olive oil, and with a novel olive oil which contains 0.001–0.15 ppm of chlorophyll and >0.2 wt. % of fatty acids.

Olive oil as a salad oil and a frying oil is appreciated for its delicious taste not only in the traditional olive oil consuming countries, the Mediterranean area, but to an increasing extent also in Western Europe and the USA.

Traditionally, olive oil is prepared by harvesting the olive fruits and subjecting these to malaxation: crushing and kneading the olives so that a mash is obtained containing the whole content of the olive fruit including an aqueous phase, an oil phase and solid remains of the olive fruits. The liquid part is quickly separated in an aqueous phase and an oil phase by decanting. The oil phase is further cleared from solid residues by filtration resulting into a first cold pressed olive oil, generally referred to as virgin olive oil.

Virgin olive oils are placed into several quality categories. Extra virgin olive oil should have an absolutely perfect flavour and odour and a free fatty acid content in terms of oleic acid of $\leq 1$ wt. %. Fine virgin olive oil is allowed to have a free fatty acid content of $\leq 2.0$ wt. %. Semi-fine or regular virgin olive oil is allowed to have a free fatty acid content of $\leq 3.3$ wt. %. When a virgin oil has an acidity of >3.3 wt. % it is denoted as Lampante oil. Besides its high acidity Lampante oil also shows bad smell and off-flavour. It is therefore relatively cheap and is only suitable for consumption after refining.

The undesired substances which are removed from the olive oil by refining comprise free fatty acids, oleanolic acid, pigments and off-flavour components.

Generally, legal provisions require the free fatty acids amount in commercial refined olive oil to be <0.5 wt. %. For complying with same provisions the content of wax esters must be <350 ppm. During a deodorisation treatment the olive oil is exposed to high temperatures during a relatively long time. Free fatty acids will react with fatty alcohols when both are present in Lampante oil under formation of undesired wax esters. Therefore high contents of free fatty acids in crude olive oil may contribute to formation of wax esters during the refining process.

Oleanolic acid is undesired because it may cause turbidity when olive oil is cooled to temperatures below ambient temperature. Removal of this component results in a transparent oil.

The pigments carotene and chlorophyll are harmless and tasteless, but are removed because a colourless olive oil is desired for many applications.

The usual processes for olive oil refining are physical refining and caustic refining. Physical refining avoids exposing the oil to alkaline chemicals and suffers less from the oil losses which make caustic refining more expensive. Caustic refining, on the other hand is necessary when a colourless oil, free from chlorophyll is desired.

Physical refining comprises the following steps:
1) washing the crude olive oil with water which is substantially free from iron, copper, zinc and calcium ions, followed by centrifuging to separate the water phase from the oil phase;
2) bleaching the washed olive oil with standard bleaching earth, followed by filtration;
3) stripping the bleached olive oil with steam at 3 mbar and 250° C. for two hours.

The content of wax esters in physically refined olive oil may be up to 400 ppm.

Although carotene is completely removed by physical refining, the refined olive oil is still coloured because it contains >0.5 ppm, usually 0.6–0.8 ppm of chlorophyll.

Caustic refining comprises the following steps:
1) washing the crude olive oil with water which is substantially free from iron, copper, zinc and calcium ions, followed by centrifuging to separate the water phase from the oil phase;
2) treating the washed olive oil with a stoechiometric excess of lye;
3) washing the deacidified olive oil with water;
4) bleaching the washed olive oil with standard bleaching earth, followed by filtration;
5) stripping the bleached olive oil with steam at 3 mbar and 250° C. for two hours.

Caustic refining results in a colourless, transparent and bland olive oil. The content of wax esters is <350 ppm. The oil contains <0.1 wt. % of free fatty acids, because for neutralization an excess of lye is used. The neutralized fatty acids form a soap which strongly promotes the neutralized olive oil to be emulsified in the aqueous phase. Subsequently the aqueous soap phase is discarded with the emulsified olive oil. On account of great oil losses, the efficiency of caustic refining is poor.

SUMMARY OF THE INVENTION

The present invention provides an efficient and economical process for refining of vegetable oil. By a sophisticated combination of refining steps the drawbacks of the conventional refining processes of vegetable oil with a high acidity have been overcome. The invented process comprises the successive steps of:

stripping an, optionally bleached, vegetable oil with an inert gas at a temperature of 120–250° C. and a pressure of 0.7 to 5 mbar for 1–60 minutes, preferably 1–30 minutes;

treating the stripped oil with lye;

bleaching the oil obtained in the previous step;

stripping the bleached oil with an inert gas at a temperature of 120–250° C. and a pressure of 0.7–5 mbar for 5–120 minutes.

The process is generally suited for vegetable oils which need a refining treatment, particularly for high acidity oils, which have a high fatty acids content such as special types of crude olive oil.

The refined olive oil which is delivered by the process is novel by its characteristic contents of chlorophyll and free fatty acids. The composition of olive oil according to the invention is characterised by the novel combination of 0.001–0.15 ppm of chlorophyll and >0.2 wt. % of free fatty acids.

DETAILS OF THE INVENTION

Before the first stripping treatment the oil to be refined may be subjected to an optional bleaching treatment. The bleaching treatment removes already some of the chlorophyll. A standard bleaching earth is suitable, but, preferably, a non-activated bleaching earth is used.

The amount of bleaching earth is 0.1 tot 2 wt. %, preferably 0.25 wt. %, based on the weight of the vegetable oil. Both optionally added phosphoric acid as well as the bleaching earth serve to remove iron and/or copper compounds. A suited amount of phosphoric acid (50% aqueous solution) is 0.02 to 0.3 wt. %.

The crude vegetable oil is washed several times with water, which is substantially free from iron, copper, zinc and calcium ions. By centrifuging oil and water are suitably separated.

The washed vegetable oil is subjected to an initial mild stripping treatment with an inert gas, preferably with steam at a temperature of 120 to 250° C. and a pressure of 0.7 to 5 mbar and for a time which depends on the stripping temperature. However, the treatment should be relatively short: less than 60 minutes and preferably less than 30 minutes, to ensure that no substantial amount of wax esters is formed. For instance, at a temperature of 240° C. and at a pressure of 3 mbar the stripping time should be less than 30 minutes. 5 to 25 m$^3$ of steam is used per kg of oil. Preferably, the stripping is carried out at a temperature of about 240° C. and a pressure of about 2 mbar.

This first stripping treatment removes at least a part of the fatty alcohols, oleanolic acid, pigments and volatile substances and a major amount of the free fatty acids. A typical reduction from 6 wt. % down to 1 wt. % prevents in the next lye treatment substantial oil losses.

The stripped vegetable oil is subjected to a treatment with lye, which generally takes places in a stirred tank under intensive agitation and at 70–100° C., preferably at 80–95° C., most preferably at 90° C. Preferably, lye is added in just enough amount to make the oil colourless. More preferably, so much lye is added that 50–250 mmol of OH$^-$ is present in the oil. When sodium hydroxide is chosen as the lye, it is added in an amount of 0.2–1% (calculated as wt. % dry NaOH on oil), preferably in the form of a 5 N lye solution. The lye treatment effectively removes pigments and oleanolic acid is removed in the same time. Since the lye is used in such small amount, only very little fatty acid soap is formed.

The lye is washed from the oil with water which is substantially free from iron, copper, zinc and calcium ions.

The lye treatment is followed by a bleaching treatment. In this step any remaining metals are removed and the amount of pigments and decomposition products is further decreased. For bleaching conditions see the first (optional) bleaching treatment above.

The next, final treatment comprises stripping the bleached oil with inert gas, preferably with steam. The conditions are chosen such that all remains of pigments and all volatile substances are removed. The conditions with respect to time and temperature can be kept so moderate that the content of wax esters remains relatively low.

The process according to the invention is suited for efficiently and economically deacidifying oils with a free fatty acid content up to 15 wt. %. It is particularly suited for coloured oils, such as olive oil and palm oil. The term olive oil in the context of this specification comprises all oils derived from olives, including oils such as Lampante oil or olive residue oil (extraction oil, also denoted as ORO) Generally, these acidic, often coloured oils show a free fatty acid contents >3 wt. %.

The present process delivers a colourless and transparent oil, having a 450 nm absorbency of <0.01. It contains less than 350 ppm wax esters and is characterized by a chlorophyll content of 0.001–0.15 ppm. The amount of free fatty acids, however, is characteristic for physically refined olive oil and is generally more than the upper limit of 0.1 wt. % resulting from caustic refining.

In the olive oil according to the invention the allowed amount of free fatty acids is at least 0.2 wt. %, preferably at least 0.3 wt. %, more preferably at least 0.4 wt. %, still more preferably at least 0.5 wt. %, still more preferably at least 0.6 wt. %. The costs of the final stripping step of the process are lower when the remaining amount of fatty acids is higher. The invention provides a process with mild stripping conditions and low exposure to alkaline chemicals. Nevertheless a bland, colourless olive oil is obtained with an acceptable fatty acid content.

The colour of olive oil can be determined by UV spectroscopy. The UV-peaks between 400 and 700 nm in crude Lampante denote the presence of chlorophyll and carotenoid compounds. These peaks have disappeared in olive oil which has been refined according to the present invention.

The obtained oil is bland and has a taste which is so stable that, when kept nine months under proper storage conditions, no change in taste can be detected.

A refined Lampante oil obtained by the present process is allowed to be denoted as "pure olive oil". Generally, it is marketed as a blend with non-refined virgin olive oil. Such blends, generally, contain 80–98 wt. % of the refined olive oil. The 0.2–15 ppm of chlorophyll present in such blends originate from the added virgin olive oil.

The refined olive oil may be incorporated also in food compositions which usually contain a substantial amount of fat, often 40 wt. % or more. The odourless and colourless oil is especially suited for the manufacture of spreads such as margarine. The fat phase of spreads used for buttering bread contain a liquid oil. The invented refined olive oil is particularly suited to serve as liquid oil for spread manufacture. It is also suited for the manufacture of mayonnaise, dressings, tomato sauces and salad oils. Usually in these food compositions 5 to 100 wt. % of the refined olive oil is incorporated.

In the present specification weight percentages are calculated on the oil phase, unless specified otherwise.

The invention is illustrated by the following example.

EXAMPLE

Crude Lampante oil containing 5 wt. % of free fatty acids is stirred with 0.08 wt. % of phosphoric acid (50% aqueous solution) for 15 minutes. Thereafter 0.25 wt. % of Volcansil™ bleaching earth is added and the mixture is stirred at 80° C. under atmospheric pressure for 20 minutes. Then the pressure is lowered and the bleaching process is continued under vacuum and at a water content of 0.1 wt. % for another 20 minutes. The bleaching earth is removed from the bleached oil by filtration.

The oil is stripped with steam at 245° C. under a pressure of 3 mbar for 10 minutes.

The stripped oil is treated with lye by intensive stirring at 90° C. for 15 minutes. 3 wt. % of 5N lye is used. The treated oil is washed twice with water which is substantially free from iron, copper, zinc and calcium ions and then centrifuged.

The washed oil is bleached with 0.25 wt. % of Volcansil™ bleaching earth under atmospheric pressure.

The bleached oil is finally stripped with steam at 200° C. under a pressure of 3 mbar for 120 minutes.

A colourless, transparent and bland oil is obtained possessing a free fatty acid content of 0.25 wt. % and 200 ppm of wax esters.

What is claimed is:

1. A process for refining vegetable oil comprising the successive steps of
    stripping vegetable oil with an inert gas at a temperature of 120–250° C. and a pressure of 0.7–5 mbar for 1–60 minutes;
    treating the stripped oil with lye;
    bleaching the oil obtained in the previous step;
    stripping the bleached oil with an inert gas at a temperature of 120–250° C. and at a pressure of 0.7–5 mbar for 5–120 minutes.

2. A process according to claim 1, wherein bleaching earth, in an amount of 0.1–2 wt. %, is used to bleach the oil.

3. A process according to claim 1, wherein lye is added in an amount sufficient to make the oil colourless.

4. A process according to claims 1, wherein lye is added until 50–250 mmol of $OH^-$ is present in the oil.

5. A process according to claims 1, wherein 0.2–1 wt. % of sodium hydroxide on oil is used as a source of lye.

6. A process according to claim 1, wherein the lye treatment is carried out at a temperature of 70–100° C.

7. A process according to claim 1, wherein the first stripping treatment is preceded by a bleaching treatment.

8. A process according to claim 1, wherein the inert stripping gas is steam.

9. A vegetable oil obtained by the process according to claim 1.

10. An olive oil obtained by the process according to claim 1.

* * * * *